(12) United States Patent
Watanabe et al.

(10) Patent No.: US 9,005,043 B2
(45) Date of Patent: Apr. 14, 2015

(54) WHEEL SUPPORTING DEVICE

(75) Inventors: Hajime Watanabe, Kashiwara (JP);
Toshihiro Hakata, Kashiwara (JP);
Shinichi Mizuta, Daito (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 13/562,771

(22) Filed: Jul. 31, 2012

(65) Prior Publication Data

US 2013/0053155 A1     Feb. 28, 2013

(30) Foreign Application Priority Data

Aug. 29, 2011   (JP) ................................ 2011-186125

(51) Int. Cl.
*F16D 1/06*    (2006.01)
*B60B 27/00*   (2006.01)

(52) U.S. Cl.
CPC ......... *B60B 27/0031* (2013.01); *B60B 27/0005* (2013.01); *B60B 27/0036* (2013.01); *B60B 2380/12* (2013.01); *B60B 2380/73* (2013.01); *B60B 2900/321* (2013.01); *B60B 2900/3314* (2013.01); *B60Y 2200/11* (2013.01)

(58) Field of Classification Search
USPC ............. 464/178, 182; 384/544, 589; 403/94, 403/96, 97, 359.6
See application file for complete search history.

(56) References Cited

U.S. PATENT DOCUMENTS

| | | | | |
|---|---|---|---|---|
| 4,440,256 A | * | 4/1984 | Palmer ........................ | 384/544 |
| 2008/0148893 A1 | | 6/2008 | Langer et al. | |
| 2009/0097792 A1 | | 4/2009 | Kamikawa et al. | |
| 2010/0038958 A1 | * | 2/2010 | Tsuzaki et al. | |
| 2011/0077089 A1 | | 3/2011 | Hirai et al. | |
| 2011/0123264 A1 | * | 5/2011 | Wang ........................ | 403/359.6 |
| 2011/0170817 A1 | | 7/2011 | Niebling et al. | |

FOREIGN PATENT DOCUMENTS

| | | |
|---|---|---|
| DE | 10 2008 050 127 A1 | 4/2010 |
| EP | 2 045 100 A2 | 4/2009 |
| JP | A-2005-170208 | 6/2005 |
| JP | A-2009-078675 | 4/2009 |
| JP | A-2009-234541 | 10/2009 |
| WO | WO 2006/105748 | 10/2006 |

OTHER PUBLICATIONS

Oct. 1, 2013 Extended European Search Report issued in European Application No. 12179329.3.

* cited by examiner

*Primary Examiner* — Gregory Binda
*Assistant Examiner* — Matthieu Setliff
(74) *Attorney, Agent, or Firm* — Oliff PLC

(57) ABSTRACT

A wheel supporting device includes: a hub unit that has a rotary ring having a first spline on its axially inner end face; and a joint that has an outer ring having a second spline, meshing with the first spline, on its axially outer end face. At least one projection included in a plurality of projections of the first spline projects in the axial direction by a larger amount than the remaining projections of the first spline. When a crest of the at least one projection contacts a crest of one of projections of the second spline, a play is caused between the rotary ring and the outer ring due to the at least one projection that works as a fulcrum.

2 Claims, 10 Drawing Sheets

F I G . 9
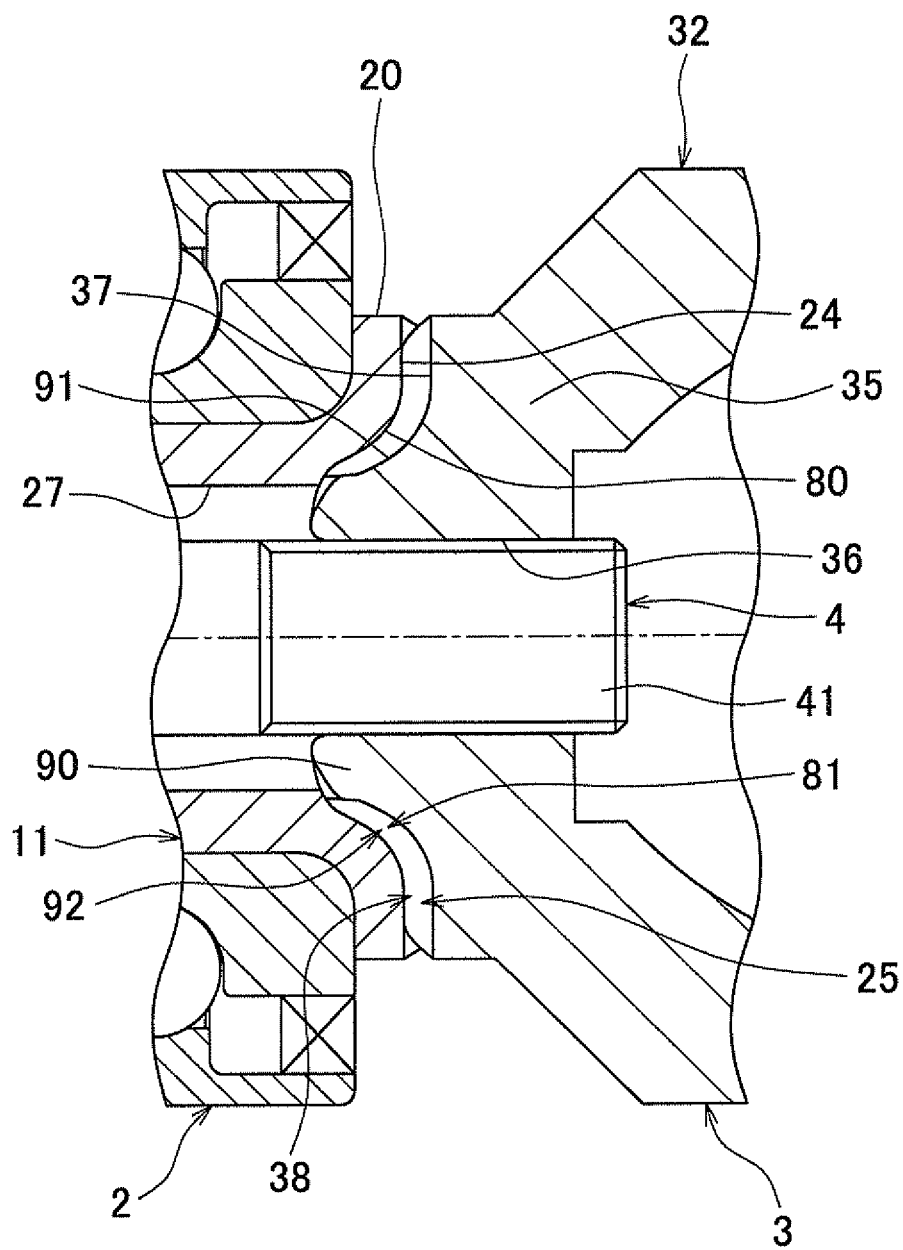

Prior Art

WHEEL SUPPORTING DEVICE

INCORPORATION BY REFERENCE

The disclosure of Japanese Patent Application No. 2011-186125 filed on Aug. 29, 2011 including the specification, drawings and abstract, is incorporated herein by reference in its entirety.

BACKGROUND OF THE INVENTION

1. Field of the Invention

The invention relates to a wheel supporting device that includes a hub unit to which a wheel is fitted and a joint coupled to the hub unit.

2. Description of Related Art

For example, Japanese Patent Application Publication No. 2009-78675 (JP 2009-78675 A) describes a wheel supporting device that includes a hub unit and a constant velocity joint. In this wheel supporting device, in order to allow transmission of torque between the hub unit and the constant velocity joint, a first spline is formed on an axially inner end face of a rotary ring of the hub unit, and a second spline that is in mesh with the first spline is formed on an axially outer end face of an outer ring of the constant velocity joint.

Each of the first and second splines has a plurality of projections that extend radially. The hub unit and the constant velocity joint are brought into contact with each other in the axial direction to mesh these splines with each other. Then, the hub unit and the constant velocity joint are fastened to each other, with a bolt, in the axial direction. In this way, the hub unit and the constant velocity joint are assembled together.

At the time of the above-described assembly, alignment between the first spline of the hub unit and the second spline of the constant velocity joint in the circumferential direction is not particularly performed. Therefore, as shown in FIG. 10, top lands 103 of the projections 102 of the first spline 101 may contact, in the axial direction, with top lands 114 of the projections 113 of the second spline 112. In this state, the hub unit and the constant velocity joint may possibly be fastened to each other with a bolt. When torque acts between the hub unit and the constant velocity joint in this state, a slip occurs between the projections 102 and the projections 113, and the projections 102 of the spline 101 fall down the gaps between the projections 113 of the spline 112. As a result, the splines 101 and 112 are in mesh with each other. However, in this case, clearances between the projections 102 and 113 in the circumferential direction are large. As a result, poor meshing occurs. That is, for example, a play that causes noise occurs or transmission of torque is interrupted.

Therefore, according to JP 2009-78675 A, an axial through-hole formed in the rotary ring (hub spindle) of the hub unit has a small-diameter hole portion that provides a slight clearance between the inner periphery of the rotary ring and a shaft portion of the bolt, and tapered hole portions into which the distal end of the shaft portion of the bolt is inserted and along which the distal end of the shaft portion is guided.

With the configuration described in JP 2009-78675 A, alignment between the huh unit and the constant velocity joint is facilitated, and the possibility that poor meshing between the splines will occur is slightly reduced. However, the diameter of the through-hole of the rotary ring is reduced along the overall length due to the formation of the small-diameter hole portion and the tapered hole portions. Therefore, the wall thickness (the size in the radial direction) of the rotary ring increases, resulting in an increase in the weight of the rotary ring.

SUMMARY OF THE INVENTION

It is an object of the invention to provide a wheel supporting device that has a new configuration that makes it possible to suppress occurrence of poor meshing between splines.

An aspect of the invention relates to a wheel supporting device that includes: a hub unit that includes a fixed ring that is fixed to a vehicle body side, a rotary ring to which a wheel is fitted and which has a first spline on an axially inner end face, and rolling elements provided between the fixed ring and the rotary ring; a joint that includes an outer ring that has a second spline, which meshes with the first spline, on an axially outer end face so that torque is transmitted between the outer ring and the rotary ring; and a coupling member that fastens the rotary ring and the outer ring, located axially inward of the rotary ring, together in an axial direction to couple the rotary ring and the outer ring to each other. At least one projection included in a plurality of projections of one of the first spline and the second spline projects in the axial direction by a larger amount than the remaining projections of the one of the first spline and the second spline. When a crest of the at least one projection contacts a crest of one of projections of the other one of the first spline and the second spline, a play is caused between the rotary ring and the outer ring due to the at least one projection that works as a fulcrum.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 9 is a longitudinal sectional view that illustrates a coupling portion at which a hub unit is coupled to a joint in the fourth embodiment.

DETAILED DESCRIPTION OF EMBODIMENTS

Figure 1:
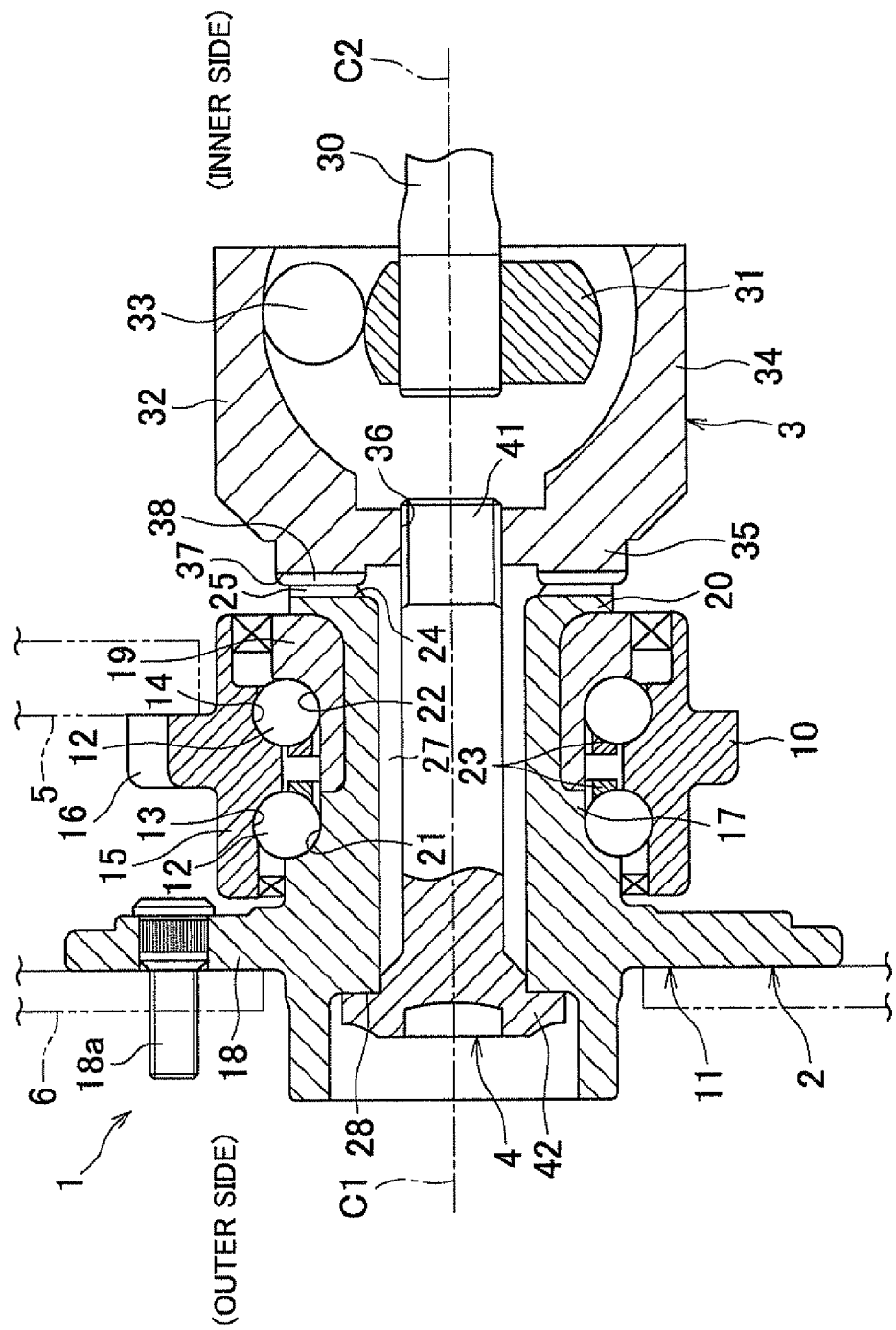
FIG. 1 is a longitudinal sectional view that shows a wheel supporting device according to embodiments of the invention.

Hereafter, embodiments of the invention will be described with reference to the accompanying drawings. The basic configuration of a wheel supporting device according to the embodiments will be described. FIG. 1 is a longitudinal sectional view that shows the wheel supporting device according to the embodiments of the invention. The wheel supporting device 1 is fixed to a suspension 5 of a vehicle, such as an automobile, and is used to hold a wheel 6 rotatable. The wheel supporting device 1 includes a hub unit 2, a joint (constant velocity joint) 3 and a bolt 4. The bolt 4 may function as a coupling member that couples the hub unit 2 to the joint 3. The hub unit 2 is fixed to the suspension 5, and the wheel 6 is fitted to the hub unit 2. The joint 3 is coupled to the hub unit 2, and transmits rotary torque to the hub unit 2. The bolt 4 may function as the coupling member that couples the hub unit 2 to the joint 3. In FIG. 1, the left side is the axially outer side (the outer side in the vehicle lateral direction), and the right side is the axially inner side (the inner side in the vehicle lateral direction).

The hub unit 2 includes a fixed ring 10, a rotary ring 11 and balls 12 that may function as rolling elements. The fixed ring 10 is fixed to the suspension 5 with bolts (not shown). The rotary ring 11 is fitted to the wheel 6. The balls 12 are provided between the fixed ring 10 and the rotary ring 11. The fixed ring 10 is provided radially outward of the rotary ring 11. The fixed ring 10 and the rotary ring 11 are arranged coaxially with the balls 12 interposed therebetween.

The fixed ring 10 has a cylindrical body portion 15 and a flange 16. The body portion 15 has raceway surfaces 13 and 14 on its inner periphery. The flange 16 extends radially outward from the body portion 15. The flange 16 is fixed to the suspension 5. In this way, the hub unit 2 is fixed to the vehicle body side member.

The rotary ring 11 has a hollow shaft portion 17, a flange 18, and an annular inner ring member 19. The shaft portion 17 has a through-hole 27 at its center. The flange 18 extends radially outward from part of an axially outer side portion of the shaft portion 17. The inner ring member 19 is fitted to the outer periphery of an axially inner side portion of the shaft portion 17. The through-hole 27 is linearly formed along the central axis of the rotary ring 11. The central axis of the rotary ring 11 coincides with the central axis C1 of the hub unit 2. The wheel 6 is fixed to the flange 18 with bolts 18a. The inner ring member 19 is fixed to the shaft portion 17, through clinching, by a large-diameter portion 20. The large-diameter portion 20 is formed by plastically deforming the axially inner end portion of the shaft portion 17 radially outward. The outer peripheries of the shaft portion 17 and inner ring member 19 have a raceway surface 21 and a raceway surface 22, respectively. A first spline 25 is formed on an axially inner end face 24 of the large-diameter portion 20 of the shaft portion 17.

Figure 2:
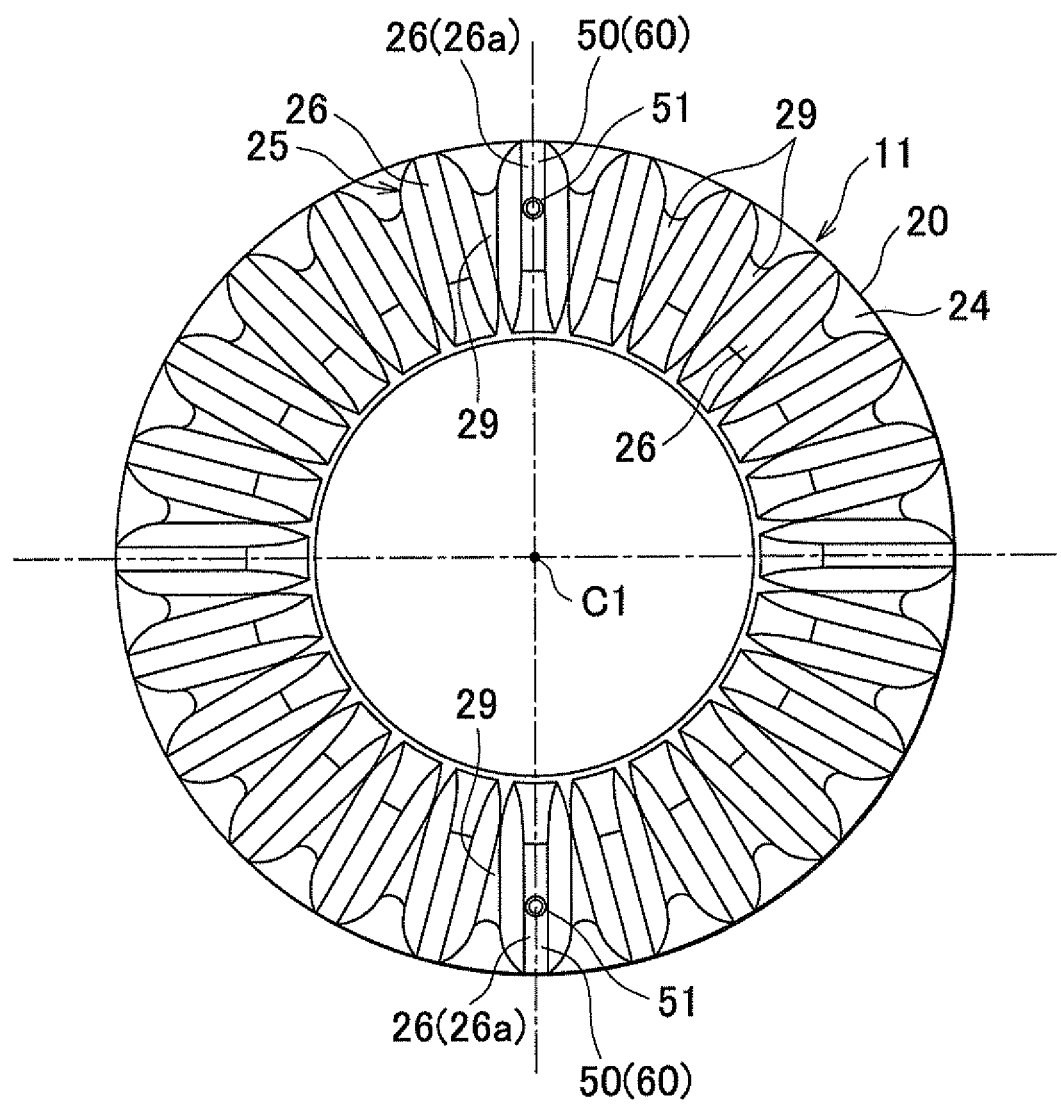
FIG. 2 is a view of a rotary ring as viewed from an axially inner side, and shows an axially inner end face and a first spline.

As shown in FIG. 2, the axially inner end face 24 of the large-diameter portion 20 is formed of an annular face that faces inward in the vehicle lateral direction. The first spline 25 is formed on the annular face. The first spline 25 has a plurality of projections 26 that are aligned in the circumferential direction. The projections 26 are arranged so as to radiate from the central axis C1 side of the hub unit 2. That is, the longitudinal direction of each projection 26 extends in the radial direction. Grooves 29, which extend radially, are formed between the projections 26 adjacent to each other in the circumferential direction. The projections 26 have the same shape, and the grooves 29 have the same shape. The first spline 25 is configured such that projections and recesses are alternately formed in the circumferential direction by the projections 26 and the grooves 29.

As shown in FIG. 1, the balls 12 are arranged in the circumferential direction, and the balls 12 are arranged in two rows. The balls 12 in one of the rows roll between the raceway surfaces 13 and 21, and the balls 12 in the other one of the rows roll between the raceway surfaces 14 and 22. A double row angular contact ball bearing is formed of the balls 12, the fixed ring 10, and the rotary ring 11. In addition, the balls 12 in each row are retained at equal intervals in the circumferential direction by a cage 23.

The joint 3 includes an inner ring 31, an outer ring 32 and a plurality of balls 33. The inner ring 31 is fixed to an axially outer end portion of a drive shaft 30. The outer ring 32 is provided radially outward of the inner ring 31. The balls 33 are provided between the inner ring 31 and the outer ring 32. The outer ring 32 has a closed-end cylindrical shape. The outer ring 32 has a cylindrical portion 34 having a cylindrical shape, and a bottom portion 35 that is integrated with an axially outer portion of the cylindrical portion 34. A bolt hole 36 is formed at the center of the bottom portion 35. A distal end portion 41 of the bolt 4 is screwed into the bolt hole 36. A second spline 38 is formed on an axially outer end face 37 of the bottom portion 35 of the joint 3.

Figure 3:
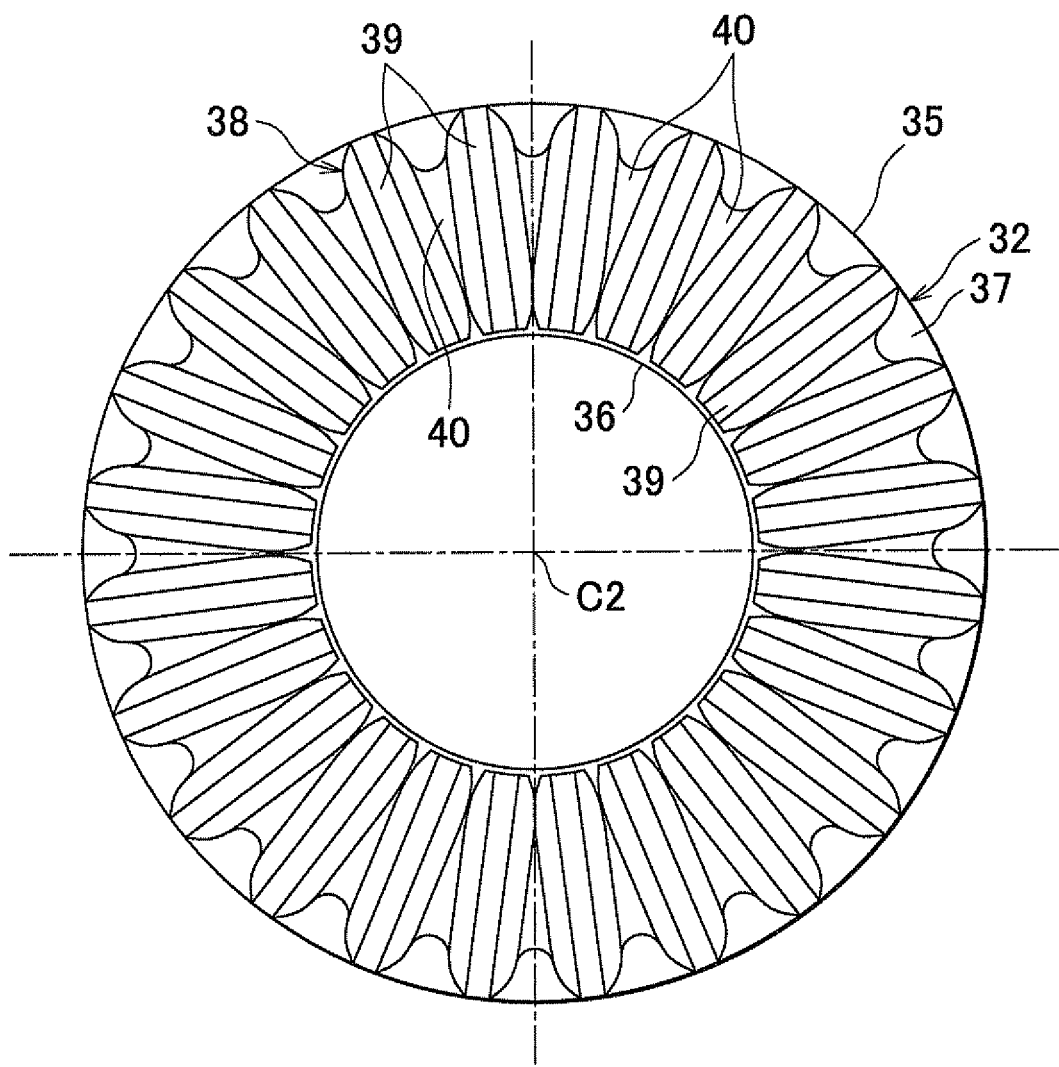
FIG. 3 is a view of an outer ring as viewed from an axially outer side, and shows an axially outer end face and a second spline.

As shown in FIG. 3, the axially outer end face 37 of the bottom portion 35 is formed of an annular face that faces outward in the vehicle lateral direction. The second spline 38 is formed on the annular face. The second spline 38 has a plurality of projections 39 that are aligned in the circumferential direction. The projections 39 are arranged so as to radiate from the central axis C2 side of the joint 3. That is, the longitudinal direction of each projection 39 extends in the radial direction. Groove 40, which extend radially, are formed between the projections 39 adjacent to each other in the circumferential direction. The projections 39 have the same shape, and the grooves 40 have the same shape. The second spline 38 is configured such that projections and recesses are alternately formed in the circumferential direction by the projections 39 and the grooves 40. The second spline 38 is in mesh with the first spline 25 (see FIG. 1 and FIG. 2). Through the mesh between the first spline 25 and the second spline 38, torque is transmitted between the rotary ring 11 of the hub unit 2 and the outer ring 32 of the joint 3.

As shown in FIG. 1, the bolt 4 is a member that fastens the rotary ring 11 and the outer ring 32, which is arranged axially inward of and coaxially with the rotary ring 11, to each other in the axial direction to couple the rotary ring 11 to the outer ring 32. The bolt 4 has a bolt head 42 and the distal end portion 41. The bolt head 42 is larger in diameter than the through-hole 27 of the rotary ring 11. The distal end portion 41 is screwed into the bolt hole 36 formed in the bottom portion 35 of the outer ring 32. The distal end portion 41 of the bolt 4 is inserted, from the axially outer side, into the through-hole 27, and then screwed into the bolt hole 36 of the outer ring 32. In this way, the bolt 4 couples the rotary ring 11 to the outer ring 32 by fastening the rotary ring 11 and the outer ring 32 together in the axial direction. In addition, because the bolt head 42 is larger in diameter than the through-hole 27, the bolt head 42 axially contacts an axially outer end face 28 of the shaft portion 17 to prevent the bolt 4 from slipping out of the rotary ring 11 toward the axially inner side. While the bolt 4 is fastened as described above and axial force acts on the bolt 4, the hub unit 2 is coupled to the joint 3, and torque is transmitted from the joint 3 to the hub unit 2. The above-described configuration is the basic configuration of the wheel supporting device 1 according to the embodiments of the invention.

Figure 4:
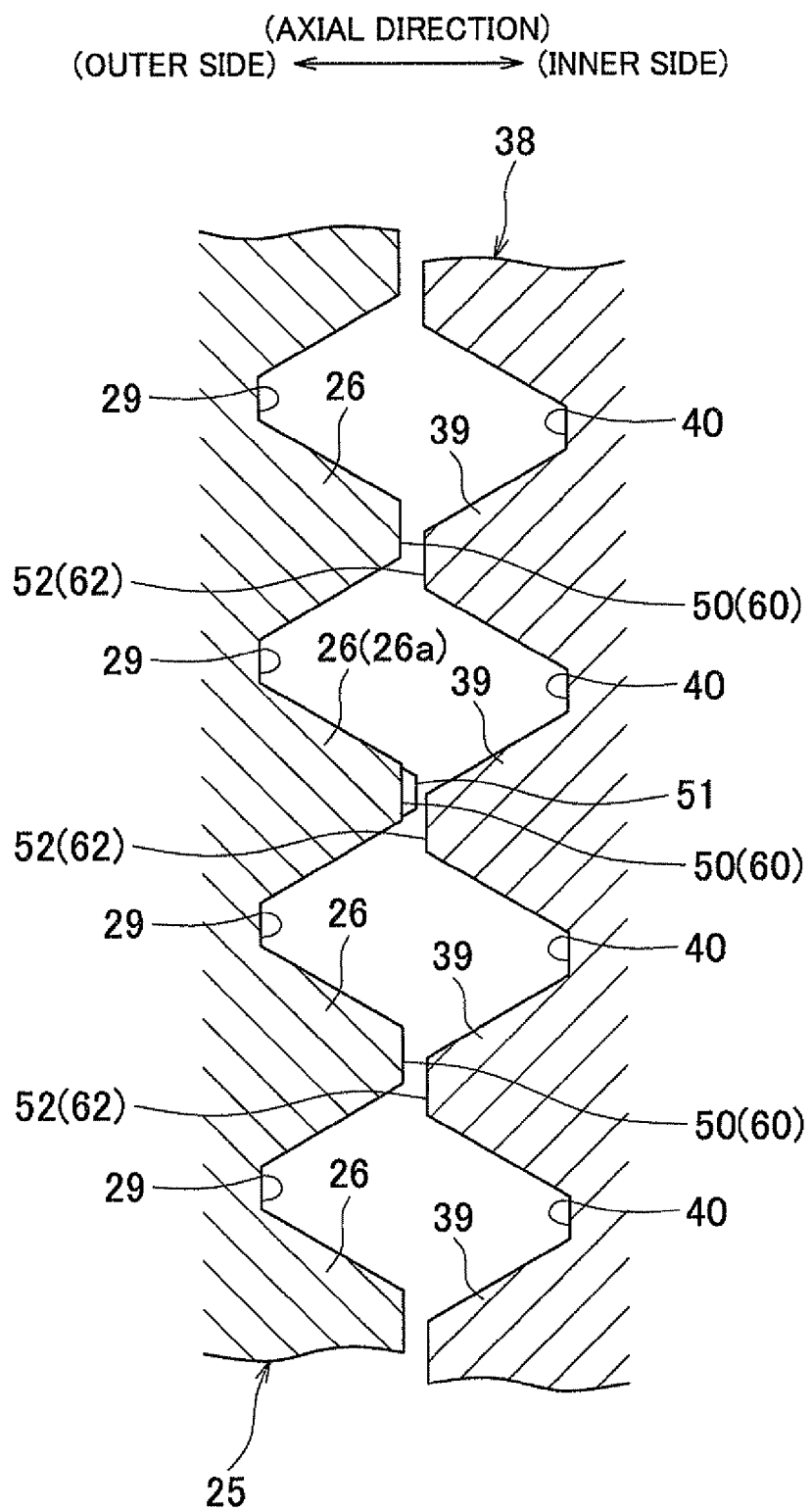
FIG. 4 is a sectional view that illustrates the first spline and the second spline according to a first embodiment of the invention.

The wheel supporting device I according to a first embodiment of the invention, which has the above-described basic configuration, will be described. FIG. 4 is a sectional view that illustrates the tooth profiles (the shapes of the projections) of the first spline 25 and second spline 38. In the wheel supporting device 1 according to the present embodiment, in the first spline 25, the projections 26 have the same shape and the grooves 29 have the same shape, as described above. Further, the projections 26 have the same sectional shape, and the grooves 29 have the same sectional shape. Protrusions 51 are formed on crests 50 of some of the projections 26 of the first spline 25. Note that, in FIG. 2 and FIG. 4, projections 26 having the protrusions 51 are indicated by reference sign 26a in parentheses. The shape of the crest 50 of each projection 26a is different from the shape of the crest 50 of each of the other projections 26. However, tooth flanks of the projections 26a and the projections 26, which contact the projections 39 of the second spline 38, all have the same shape. Note that, in the second spline 38, the projections 39 have the same shape, and the grooves 40 have the same shape. Further, the projections 39 have the same sectional shape, and the grooves 40 have the same sectional shape.

The protrusion 51 is a portion that protrudes axially inward from the crest 50 (top land 60) of the projection 26, and is formed in a dot shape in the present embodiment (see FIG. 2). In this way, the projections 26a that are some of the projections 26 of the first spline 25 project further axially inward than the remaining projections 26 of the first spline 25 by an amount corresponding to the height of the protrusion 51.

Note that, only one or two projections 26a among the projections 26 of the first spline 25 need to project further axially inward than the remaining projections 26 of the first spline 25. That is, the protrusion 51 needs to be formed on the crest 50 of each of one or two projections 26a among the projections 26 of the first spline 25. In the present embodiment (FIG. 2), the protrusion 51 is formed on the crest 50 of each of the two projections 26a, and the two projections 26a project further axially inward than the remaining projections 26. The projections 26a on which the protrusions 51 are formed are located at positions offset from each other by 180° about the central axis C1.

The function of the protrusion 51 will be described below. Referring to FIG. 1, a worker brings the rotary ring 11 of the hub unit 2 and the outer ring 32 of the joint 3 closed to each other in the axial direction in order to couple the hub unit 2 to the joint 3 using the bolt 4. Then, the rotary ring 11 and the outer ring 32 are brought into contact with each other in the axial direction, and then the hub unit 2 and the joint 3 are fastened together with the bolt 4 in the axial direction. In this way, the rotary ring 11 and the outer ring 32 are assembled together. At this time, alignment between the first spline 25 and the second spline 38 in the circumferential direction is not particularly performed. Therefore, as shown in FIG. 4, the crests 50 (top lands 60) of the projections 26 of the first spline 25 may contact crests 52 (top lands 62) of the projections 39 of the second spline 38 in the axial direction.

When the crests 50 of the projections 26 and the crests 52 of the projections 39 contact each other in this way, the protrusions 51 formed on the projections 26a of the first spline 25 contact the crests 52 (top lands 62) of the projections 39 of the second spline 38, and a play is caused between the rotary ring 11 and the outer ring 32 due to the point at which the protrusions 51 contact the crests 52 and which works as a fulcrum. Therefore, the worker is able to easily sense the play. That is, the worker is able to easily sense the contact between the crests 50 of the projections 26 of the first spline 25 and the crests 52 of the projections 39 of the second spline 38. Then, the worker causes slight relative rotation between the rotary ring 11 and the outer ring 32 to achieve a state where the first spline 25 and the second spline 38 are in mesh with each other (see FIG. 5). As a result, it is possible to prevent the assembly from being completed with the crests 50 of the projections 26 and the crests 52 of the projections 39 remain in contact with each other.

Particularly, in the present embodiment, as shown in FIG. 2, there are only the two projections 26a on which the protrusions 51 are formed. Therefore, when the crests 50 of the projections 26 and the crests 52 of the projections 39 are in contact with each other, the protrusions 51 reliably place the mesh between the rotary ring 11 and the outer ring 32 in an unstable state to cause a play therebetween. Note that the number of the projections 26a on which the protrusions 51 are formed may be other than two, for example, one. In this case as well, the mesh between the rotary ring 11 and the outer ring 32 is reliably placed in an unstable state to cause a play therebetween.

Figure 5:
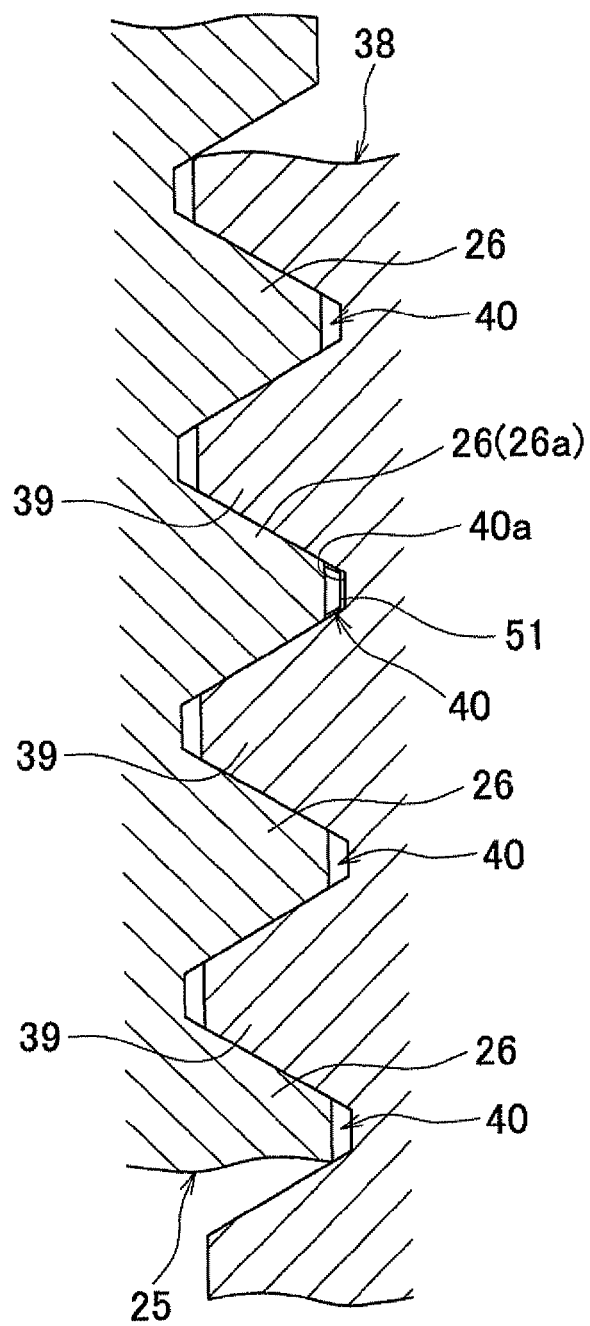
FIG. 5 is a sectional view that shows a state where the first spline and the second spline are in mesh with each other in the first embodiment.

In addition, as shown in FIG. 5, when the first spline 25 is in mesh with the second spline 38, the protrusions 51 are located close to bottomlands 40a of the grooves 40 of the second spline 38, but the protrusions 51 are not in contact with the bottomlands 40a. Thus, in a meshed state, the tooth flanks of the projections 26 and 39 are in contact with each other, so an appropriate contact state is obtained.

In addition, the number of the projections 26a on which the protrusions 51 are formed may be other than one and two, for example, may be three, or four or more. However, in this case, the projections 26a on which the protrusions 51 are formed need to be located at positions at unequal intervals in the circumferential direction (positions at unequal intervals). Thus, when the crests 50 of the projections 26a, which are some of the projections 26 and on which the protrusions 51 are formed, contact the crests 52 of the projections 39 of the second spline 38, a play is caused between the rotary ring 11 and the outer ring 32 due to the projections 26a that contact the crests 52 and that work as fulcrums.

Furthermore, in the above-described embodiment, the protrusions 51 are formed on the crests 50 of the projections 26a of the first spline 25 of the hub unit 2. On the other hand (although not shown in the drawing), the protrusions 51 may be formed on the crests 52 of the projections 39 of the second spline 38 of the joint 3. That is, the protrusions 51 need to be formed on the crests of the projections of one of the first spline 25 and the second spline 38. With this structure, when the crests of the projections of one of the first spline 25 and the second spline 38 contact the crests of the projections of the other one of the first spline 25 and the second spline 38, a play is caused between the rotary ring 11 and the outer ring 32 due to the points at which the projections contact each other and which work as fulcrums.

A method of forming the protrusions 51 will be described below. In the present embodiment, as described above, the axially inner end portion of the shaft portion 17 is plastically deformed radially outward to form the large-diameter portion 20. In this process of forming the large-diameter portion 20, the first spline 25 and the protrusions 51 are formed. That is, although not shown in the drawing, during formation of the large-diameter portion 20 or after formation of the large-diameter portion 20, a punch is pressed against the axially inner end portion of the shaft portion 17 in the axial direction by pressing work to form the first spline 25. For this purpose, the distal end face of the punch has a corrugated surface for forming the first spline 25. Recesses (holes) are formed on part of the corrugated surface of the punch, and the material that forms the axially inner end portion of the shaft portion 17 partially flows into the recesses and becomes the protrusions 51. With the above-described forming method, the protrusions 51 are easily formed.

In addition, each protrusion 51 may be in a shape other than a dot shape. Although not shown in the drawing, each protrusion 51 may be long in the longitudinal direction of the projection 26a. For example, a band-shaped protrusion may be formed along the overall length of the projection 26a. Further, instead of forming the protrusions 51, there may be employed a configuration in which some of the projections 26 themselves project in the axial direction by a larger amount than the remaining projections 26, that is, the height of the some of the projections 26 is larger than that of the remaining projections 26.

Figure 6:
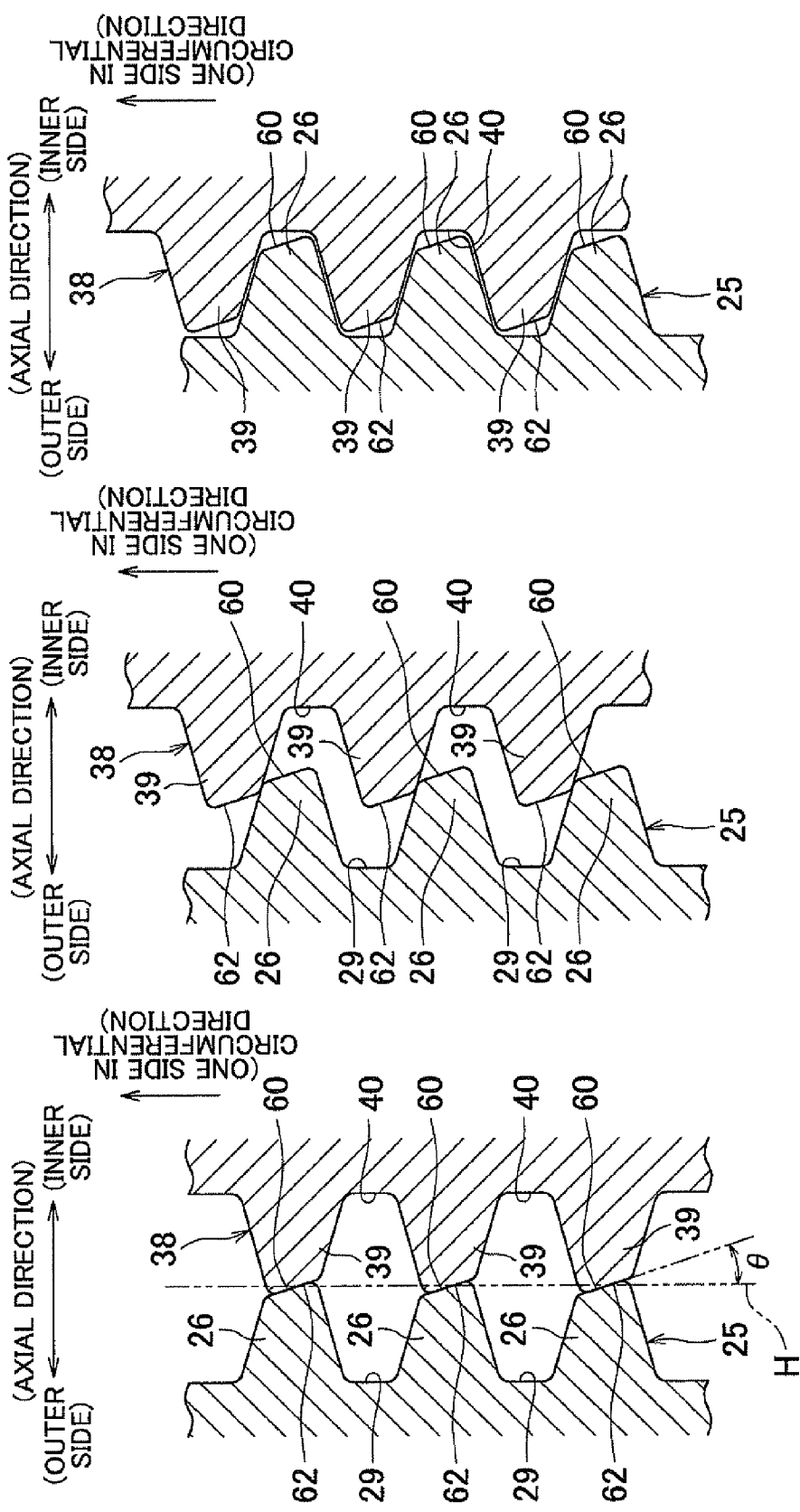
FIG. 6A to FIG. 6C are sectional views that illustrate the tooth profiles (the shapes of projections) of a first spline and second spline according to a second embodiment of the invention.

The wheel supporting device 1 according to a second embodiment of the invention, which has the above-described basic configuration, will be described. FIG. 6A to FIG. 6C are sectional views that illustrate the tooth profiles (the shapes of the projections) of the first spline 25 and second spline 38. In the wheel supporting device 1 according to the present embodiment, as described above, the projections 26 have the same shape and the grooves 29 have the same shape in the first spline 25. Further, the projections 26 have the same sectional shape and the grooves 29 have the same sectional shape. In addition, the projections 39 have the same shape and the grooves 40 have the same shape in the second spline 38. Further, the projections 39 have the same sectional shape and the grooves 40 have the same sectional shape.

In the present embodiment, the top land 60 of each of the projections 26 of the first spline 25 is inclined with respect to an imaginary plane H (see FIG. 6A) that is perpendicular to the central axis C1 of the rotary ring 11 and the central axis C2 of the outer ring 32. The inclination direction of each top land 60 is the same along the circumferential direction. In addition, in the present embodiment, the top land 62 of each of the projections 39 of the second spline 38 is also inclined with respect to the plane H. The inclination direction of each top land 62 is the same along the circumferential direction. The top lands 60 are inclined with respect to the plane H such that the height thereof is reduced toward one side in the circumferential direction, and the top lands 62 are inclined with respect to the plane H such that the height thereof is increased toward the one side in the circumferential direction.

The "one side in the circumferential direction" toward which the height of the top lands 60 is reduced and the height of the top lands 62 is increased will be described. As shown in FIG. 1, the bolt 4 that couples the hub unit 2 to the joint 3 is passed through the rotary ring 11 while the bolt head 42 prevents the bolt 4 from slipping out of the rotary ring 11 toward the axially inner side. Then, a relative rotation between the bolt 4 and the outer ring 32 is caused to screw the distal end portion 41 of the bolt 4 into the bolt hole 36 formed in the bottom portion 35 of the outer ring 32 to thereby fasten the rotary ring 11 and the outer ring 32 together in the axial direction. Particularly, immediately before the first spline 25 contacts the second spline 38 in the axial direction, the outer ring 32 and the rotary ring 11 are placed in the fixed state. After that, the fixed state is continued. The bolt 4 is rotated toward one side in the circumferential direction with respect to the outer ring 32 and the rotary ring 11 that are in the fixed state. Due to the rotation of the bolt 4, the outer ring 32 also attempts to rotate together with the bolt 4 toward the one side in the circumferential direction. The direction in which the bolt 4 is rotated with respect to the outer ring 32 in order to fasten the rotary ring 11 and the outer ring 32 together in the axial direction by the bolt 4 is set as the "one side in the circumferential direction".

The function provided by the inclined shapes of the top lands 60 and top lands 62 will be described. Referring to FIG. 1, a worker brings the rotary ring 11 of the hub unit 2 and the outer ring 32 of the joint 3 close to each other in the axial direction in order to couple to the hub unit 2 to the joint 3 using the bolt 4. Then, the rotary ring 11 and the outer ring 32 are brought into contact with each other in the axial direction, and then the hub unit 2 and the joint 3 are fastened together by the bolt 4 in the axial direction. In this way, the rotary ring 11 and the outer ring 32 are assembled together. At this time, alignment between the first spline 25 of the hub unit 2 and the second spline 38 of the joint 3 in the circumferential direction is not particularly performed. Therefore, as shown in FIG. 6A, the top lands 60 of the projections 26 of the first spline 25 and the top lands 62 of the projections 39 of the second spline 38 may contact each other in the axial direction.

Even when the top lands 60 of the projections 26 and the top lands 62 of the projections 39 contact each other, because the height of the top lands 60 is reduced and the height of the top lands 62 is increased toward the "one side in the circumferential direction" that is the same as the side toward which the outer ring 32 attempts to rotate in the circumferential direction together with the bolt 4, the top lands 62 of the projections 39 of the outer ring 32 that attempts to rotate together with the bolt 4 slip toward the one side in the circumferential direction along the inclined top lands 60 of the projections 26 of the fixed rotary ring 11, as a fastening work for fastening the bolt 4 progresses. Therefore, the state where the top lands 60 and 62 are in contact with each other is spontaneously cancelled (see FIG. 6B), and the splines 25 and 38 are meshed with each other (see FIG. 6C). Therefore, it is possible to prevent the assembly from being completed with the top lands 60 of the projections 26 of the first spline 25 and the top lands 62 of the projections 39 of the second spline 38 remain in contact with each other.

Note that the inclination angle θ of each of the top lands 60 and 62 with respect to the plane H is desirably larger than or equal to 8°. The inclination angle θ is set on the basis of a coefficient of friction between the top lands 60 of the projections 26 and the top lands 62 of the projections 39. In the present embodiment, contact between the top lands 60 and 62 is contact between metal surfaces. With the inclination angle (θ≥8°, when the top lands 60 of the projections 26 and the top lands 62 of the projections 39 contact with each other in the axial direction through fastening of the bolt 4, axial force acts on the top lands 60 and 62. However, circumferential component of force is caused by the inclined faces (top lands 60 and 62) to cause a slip in the circumferential direction between the top lands 60 and 62.

In the embodiment described above, both the top lands 60 of the projections 26 of the first spline 25 and the top lands 62 of the projections 39 of the second spline 38 are inclined. However, only one of the first spline 25 and the second spline 38 may have projections with inclined top lands.

Figure 7:
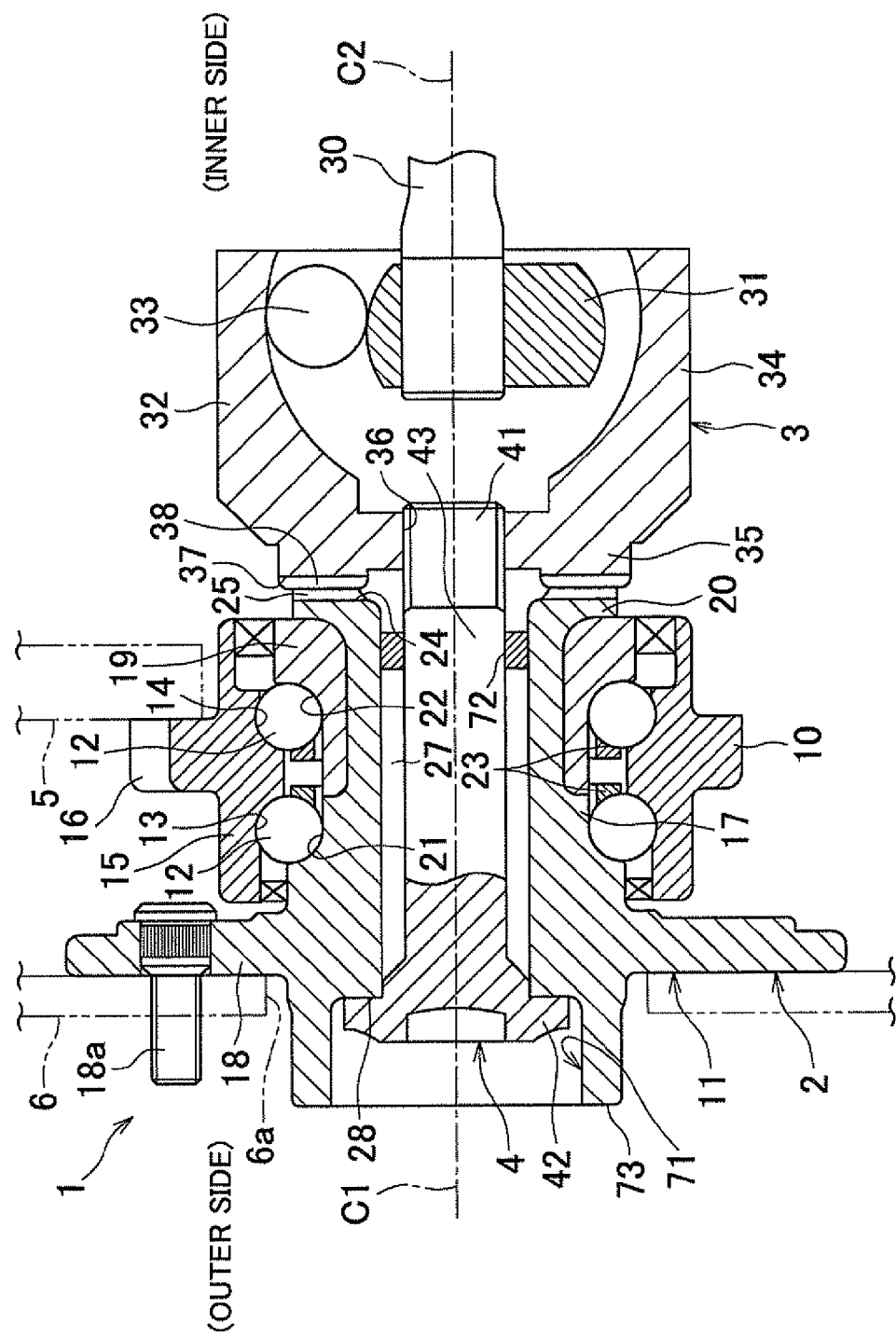
FIG. 7 is a longitudinal sectional view of a wheel supporting device according to a third embodiment of the invention.

The wheel supporting device 1 according to a third embodiment of the invention, which has the above-described basic configuration, will be described. FIG. 7 is a longitudinal sectional view of the wheel supporting device 1 according to the third embodiment. Note that the basic configuration is the same as the configuration illustrated in FIG. 1, so the description thereof is omitted here. As described above, the bolt 4 has the bolt head 42 and the distal end portion 41. The bolt head 42 is larger in diameter than the through-hole 27 of the rotary ring 11 of the hub unit 2. The distal end portion 41 is screwed into the bolt hole 36 formed in the bottom portion 35 of the outer ring 32 of the joint 3. Then, the distal end portion 41 of the bolt 4 is inserted, from the axially outer side, into the rotary ring 11 to screw the distal end portion 41 into the bolt hole 36. In this way, the rotary ring 11 and the outer ring 32 are fastened together in the axial direction to couple the rotary ring 11 to the outer ring 32.

In the present embodiment, the rotary ring 11 has a first guide portion 71 and a second guide portion 72 that is located axially inward of the first guide portion 71. The first guide portion 71 and the second guide portion 72 guide the bolt 4 with respect to the radial direction. The first guide portion 71 is formed of a circular hole formed at an axially outer end portion of the rotary ring 11. In the present embodiment, the first guide portion 71 is defined by a cylindrical portion 73 that projects axially outward from the axially outer end portion of the rotary ring 11. The inner periphery of the cylindrical portion 73 has a diameter slightly larger than the diameter of the outer periphery of the bolt head 42 that has a circular shape as viewed from the axial direction. The cylindrical portion 73 (inner periphery) and the through-hole 27 are formed coaxially with the rotary ring 11. The bolt head 42 is guided with respect to the radial direction by the inner periphery of the cylindrical portion 73, and the bolt 4 is guided so as to be coaxial with the rotary ring 11. Note that the cylindrical portion 73 is a wheel spigot that is passed through a hole 6a formed at the center of the wheel 6 to be fitted to the flange 18. That is, the cylindrical portion 73 not only functions as an assist member for fitting the wheel 6 to the flange 18 but also functions to as a guide that guides the bolt 4.

The second guide portion 72 is formed of an annular member that is fitted in an axially inner-side portion of the through-hole 27 of the rotary ring 11. That is, the second guide portion 72 is a member separate from the rotary ring 11 (shaft portion 17). The second guide portion 72 is press-fitted into the through-hole 27 to be fixed. In addition, the second guide portion 72 is desirably made of resin in order to reduce the weight of the hub unit 2. The diameter of the inner periphery of the second guide portion 72 is slightly larger than the outside diameter of the shaft portion 43 at a portion under the bolt head. The second guide portion 72 guides part of the shaft portion 43 in the radial direction, at the axially inner side of the rotary ring 11, and guides the bolt 4 such that the bolt 4 is coaxial with the rotary ring 11.

The clearance between the first guide portion 71 (the inner periphery of the cylindrical portion 73) and the outer periphery of the circular bolt head 42 is desirably smaller than or equal to 0.5 mm in diameter. In addition, the clearance between the inner periphery of the second guide portion 72 and the outer periphery of the shaft portion 43 is desirably smaller than or equal to 0.3 mm in diameter. By setting the clearance in this way, it is possible to prevent a misalignment between the rotary ring 11 and the bolt 4.

In the joint 3, the bolt hole 36 is formed about the central axis C2 of the joint 3 (outer ring 32). Therefore, by screwing the distal end portion 41 of the bolt 4 into the bolt hole 36, the bolt 4 and the outer ring 32 of the joint 3 are coupled to each other so as to be coaxial with each other.

Thus, the distal end portion 41 of the bolt 4 is inserted from the axially outer side into the through-hole 27 of the rotary ring 11, and the bolt 4 is guided by the first guide portion 71 and the second guide portion 72. In this way, the bolt 4 and the rotary ring 11 are coaxially arranged. In addition, the bolt 4 is screwed into the bolt hole 36 of the outer ring 32. In this way, the bolt 4 and the outer ring 32 are coaxially arranged. As a result, the rotary ring 11 and the outer ring 32 are coaxially arranged.

Note that, when the rotary ring 11 and the outer ring 32 are not coaxially arranged, the top lands of the projections 26 of the first spline 25 of the hub unit 2 and the top lands of the projections 39 of the second spline 38 of the joint 3 tend to contact each other in the axial direction. However, according to the present embodiment, because the rotary ring 11 and the outer ring 32 are coaxially arranged, it is possible to prevent the assembly from being completed with the top lands of the projections 26 of the first spline 25 and the top lands of the projections 39 of the second spine 38 remain in contact with each other due to misalignment between the rotary ring 11 and the outer ring 32.

In addition, in the present embodiment, the second guide portion 72 is formed of an annular member that is fitted in the through-hole 27. Therefore, the diameter of the through-hole 27 need not be reduced, and it is possible to increase the diameter of the through-hole 27. That is, the thickness of the rotary ring 11 is reduced, and the weight of the hub unit 2 is reduced.

Figure 8:
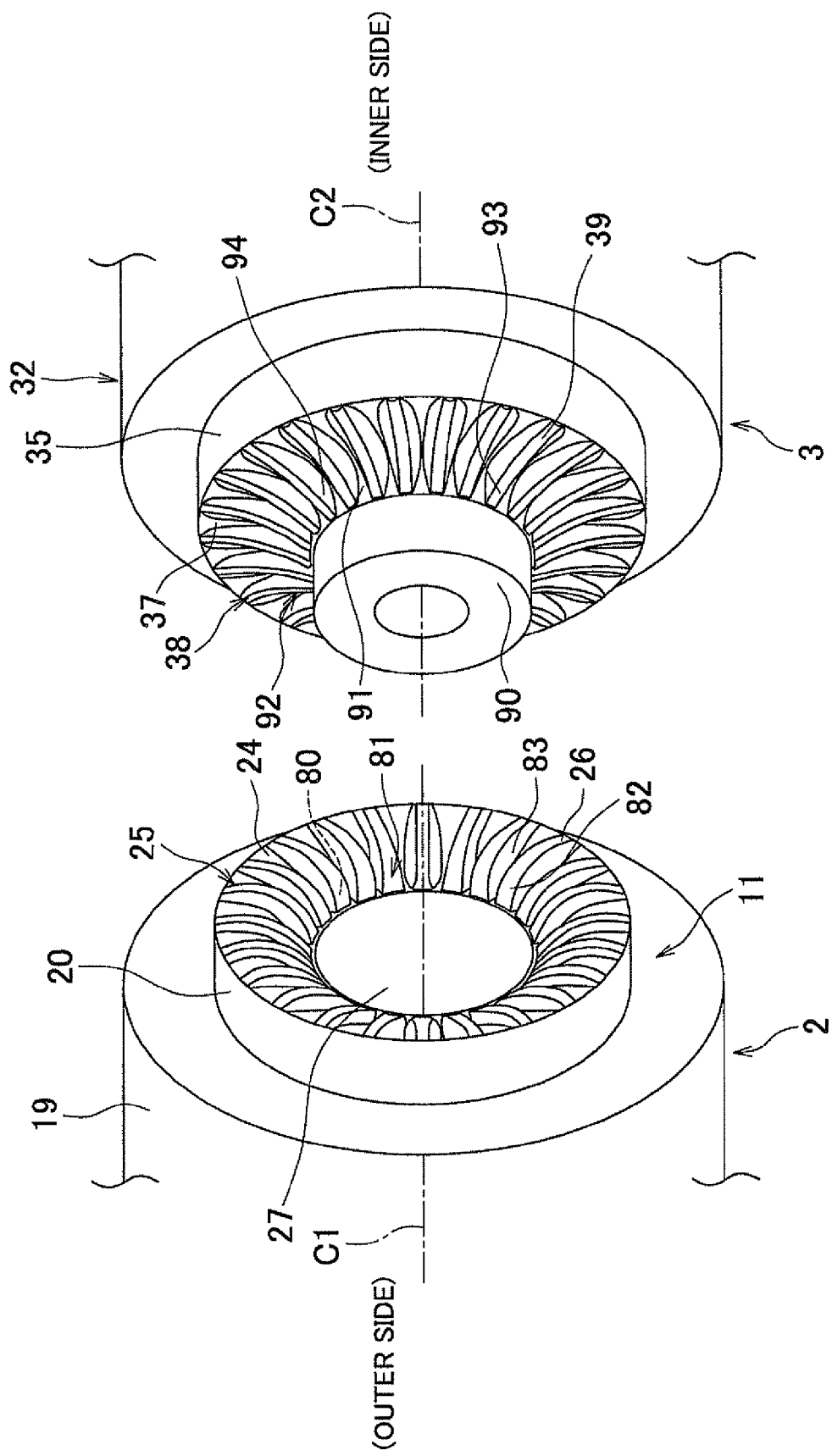
FIG. 8 is a view that illustrates a first spline and a second spline according to a fourth embodiment of the invention.
Figure 10:
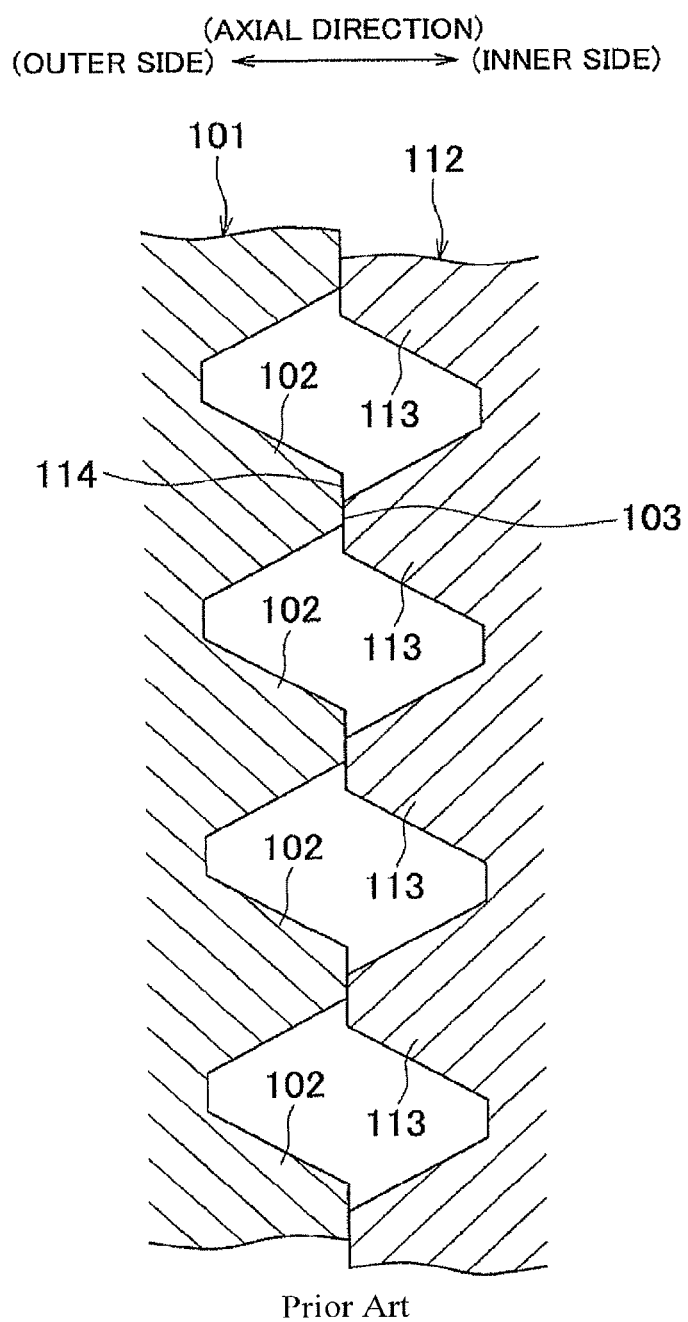
FIG. 10 is a view that illustrates an inconvenience in a conventional wheel supporting device.

The wheel supporting device 1 according to a fourth embodiment of the invention, which has the above-described basic configuration, will be described. FIG. 8 is a view that illustrates the first spline 25 and the second spline 38 according to the present embodiment. As described above, in the hub unit 2, the first spline 25 is formed on the axially inner end face 24 of the rotary ring 11. In the present embodiment, the first spline 25 is referred to as "first main spline 25". In addition, as described above, in the joint 3, the second spline 38 is formed on the axially outer end face 37 of the outer ring 32. In the present embodiment, the second spline 38 is referred to as "second main spline 38". When the first main spline 25 and the second main spline 38 are in mesh with each other, torque is transmitted between the rotary ring 11 and the outer ring 32.

The axially inner end face 24 of the rotary ring 11 (large-diameter portion 20) is formed of an annular face that faces inward in the axial direction. The first main spline 25 is formed on this annular face. In the present embodiment, the inner periphery of the axially inner end portion (large-diameter portion 20) of the rotary ring 11 is formed of an arc face 80 that gradually reduces in diameter from the radially inner side portion of the axially inner end face 24. The arc face 80 is contiguous with the inner periphery of the rotary ring 11, which extends linearly in the axial direction. A first sub-spline 81 is formed on the arc face 80.

The first sub-spline 81 has a plurality of projections 82 aligned in the circumferential direction. The projections 82 are arranged so as to radiate along the arc face 80. The projections 82 are formed to extend along the direction in which the diameter of the arc face 80 increases. Grooves 83, which extend in the radial direction along the arc face 80, are formed between projections 82 adjacent to each other in the circumferential direction. The projections 82 have the same shape, and the grooves 83 have the same shape. The projections 82 of the first sub-spline 81 are formed to extend axially outward so as to be contiguous with and in the same phase as the projections 26 of the first main spline 25.

In addition, as described above, the axially outer end face 37 of the outer ring 32 is formed of an annular face that faces outward in the axial direction. The second main spline 38 is formed on this annular face. In the present embodiment, the bottom portion 35 of the outer ring 32 has a circular cylindrical portion 90 that projects outward in the axial direction. The outer periphery of the cylindrical portion 90 has an arc face 91 that gradually reduces in diameter from the radially inner side portion of the axially outer end face 37. The arc face 91 is contiguous with the outer periphery of a portion of the cylindrical portion 90, which extends linearly in the axial direction. A second sub-spline 92 is formed on the arc face 91.

The second sub-spline 92 has a plurality of projections 93 aligned in the circumferential direction. The projections 93 are arranged so as to radiate along the arc face 91. The projections 93 are formed to extend in the direction in which the diameter of the arc face 91 increases. Grooves 84, which extend in the radial direction along the arc face 91, are formed between projections 93 adjacent to each other in the circumferential direction. The projections 93 have the same shape, and the grooves 94 have the same shape. The projections 93 of the second sub-spline 92 are formed to extend axially outward so as to be contiguous with and in the same phase as the projections 39 of the second main spline 38.

As shown in FIG. 9, the first sub-spline 81 of the hub unit 2 is in mesh with the second sub-spline 92 of the joint 3. Note that, in the state where the first sub-spline 81 is completely in mesh with the second sub-spline 92 (state shown in FIG. 9), the first main spline 25 is in mesh with the second main spline 38.

With the first sub-spline 81 and second sub-spline 92, the area in which the splines are in mesh with each other to transmit torque between the hub unit 2 and the joint 3 is made larger than that in the case shown in FIG. 1. In addition, the first sub-spline 81 and second sub-spline 92 function as guide members for causing the first main spline 25 of the hub unit 2 to mesh with the second main spline 38 of the joint 3. That is, a worker brings the rotary ring 11 of the hub unit 2 and the outer ring 32 of the joint 3 close to each other in the axial direction in order to couple to the hub unit 2 to the joint 3 using the bolt 4. Then, before the first main spline 25 of the hub unit 2 is in mesh with the second main spline 38 of the joint 3, the first sub-spline 81 of the rotary ring 11 is meshed with the second sub-spline 92 of the outer ring 32. When the rotary ring 11 and the outer ring 32 are brought close to each other in the axial direction with the first sub-spline 81 and the second sub-spline 92 meshed with each other, the first main spline 25 and the second main spline 38 are completely meshed with each other. That is, the first and second sub-splines 81 and 92 function as axial guides for meshing the first and second main splines 25 and 38 with each other. Therefore, it is possible to prevent the assembly from being completed with the top lands of the projections 26 of the main spline 25 and the top lands of the projections 39 of the main spline 38 remain in contact with each other due to misalignment between the central axis of the rotary ring 11 and the central axis of the outer ring 32. The projections 82 and 93 may have shapes other than the above-described ones, for example, the projections 82 and 93 may extend linearly instead of extending in an arc-shape. In other words, the projections 82 and 93 may be in any shapes as long as the first sub-spline 81 and the second sub-spline 92 are able to guide the first main spline 25 and the second main spline 38 in the axial direction to facilitate meshing between the first main spline 25 and the second main spline 38.

As described above, with the wheel supporting device according to the above embodiments, it is possible to prevent the assembly from being completed with the top lands of the projections 26 of the first spline 25 of the hub unit 2 and the top lands of the projections 39 of the second spline 38 of the joint 3 remain in contact with each other. Thus, it is possible to obtain a coupling structure that allows reliable torque transmission between the hub unit 2 and the joint 3. Therefore, it is possible to prevent faulty assembly of the hub unit 2 and the joint 3, which may cause inconveniences in the related art, such as noise at the splines and interruption of torque transmission.

The wheel supporting device according to the invention is not limited to the illustrated embodiments, and various modifications may be made within the scope of the invention. For example, the type of the joint 3 may be other than the above-described one, and the shape of the bolt 4 (bolt head 42) may also be other than the above-described one. In addition, the configuration of the third embodiment (guide portions 71 and 72) may be directly applied to the other embodiments.

With the wheel supporting device according to the invention, it is possible to prevent the assembly from being completed with the top lands of the splines of the hub unit and the top lands of the splines of the joint remain in contact with each other. As a result, it is possible to reliably transmit torque between the hub unit and the joint.

What is claimed is:
1. A wheel supporting device, comprising:
a hub unit that includes:
a fixed ring that is fixed to a vehicle body side,
a rotary ring to which a wheel is fitted and which comprises a first main spline, comprising a plurality of projections, on an axially inner end face, wherein an inner periphery of the rotary ring is formed with a first arc face so that the first arc face is contiguous with the inner periphery of the rotary ring, and
rolling elements provided between the fixed ring and the rotary ring;
a joint that includes an outer ring that comprises:
a second main spline, which meshes with the first main spline and comprises a plurality of projections, on an axially outer end face so that torque is transmitted between the outer ring and the rotary ring,
a circular cylindrical portion that projects outward in an axial direction from an axially outer end face of a bottom portion, the circular cylindrical portion being integrally formed with the bottom portion, wherein the bottom portion extends from an axially outer end face of the outer ring, wherein the circular cylindrical portion comprises a first part and a second part, wherein the first part does not have any splines, wherein a second arc face is formed on an outer periphery of the second part of the circular cylindrical portion and that is contiguous with the circular cylindrical portion; and
a coupling member that fastens the rotary ring and the outer ring, located axially inward of the rotary ring, together in an axial direction to couple the rotary ring and the outer ring to each other, wherein:
a through-hole of the rotary ring is configured to mesh with the joint without the use of splines,
the first part of the circular cylindrical portion extends in the axial direction into the through-hole of the rotary ring and ends at a point before a midpoint of the through-hole and the second part of the circular cylindrical portion having the second arc face does not extend into the through-hole,
the rotary ring comprises a first sub-spline that is formed on the first arc face and that comprises a plurality of projections that extend axially so as to be contiguous with and in the same phase as the projections of the first main spline, and
the outer ring comprises a second sub-spline that is formed on the second arc face and that comprises a plurality of projections that extend axially so as to be contiguous with and in the same phase as the projections of the second main spline, the second sub-spline meshing with the first sub-spline.

2. The wheel supporting device according to claim 1, wherein the second main spline is formed on the axially outer end face of the bottom portion.

* * * * *